Sept. 17, 1929.  A. B. SMALL  1,728,809
DEVICE FOR PREVENTING RETROGRADE MOVEMENT OF VEHICLES
Filed July 16, 1927
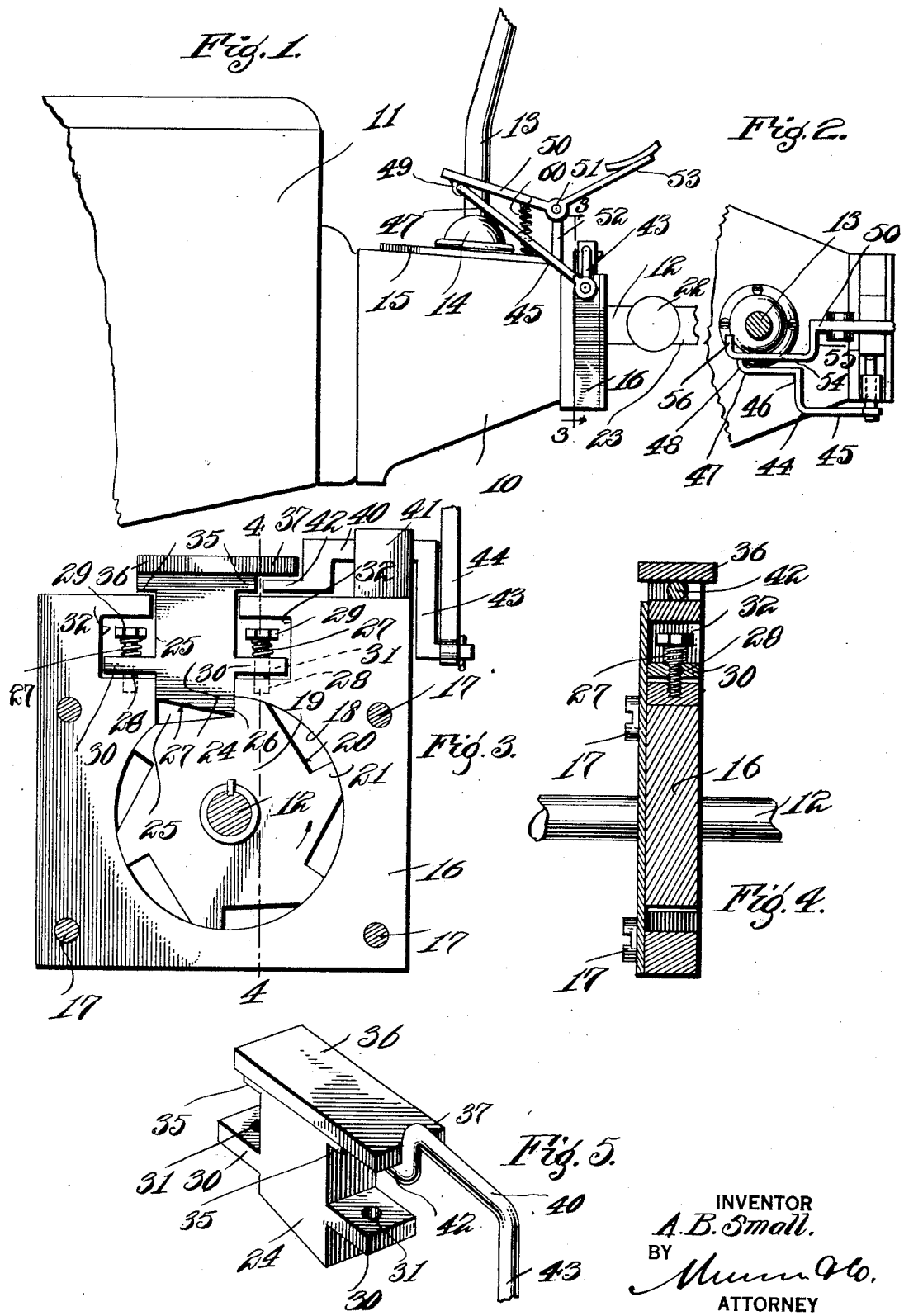
INVENTOR
A. B. Small.
BY
ATTORNEY Patented Sept. 17, 1929

1,728,809

UNITED STATES PATENT OFFICE

ALFRED B. SMALL, OF MIAMI, FLORIDA

DEVICE FOR PREVENTING RETROGRADE MOVEMENT OF VEHICLES

Application filed July 16, 1927. Serial No. 206,336.

This invention relates to a device for preventing retrograde movement of a vehicle.

An object of the invention is the provision of a device for normally preventing retrograde movement of a vehicle through the action of a locking device directly associated with the drive shaft of an automobile, and having connection with the shifting lever whereby the locking means will automatically be placed in an inoperative position when the shifting lever has been moved to such a position that it is desired to cause retrograde movement of the vehicle under the power of the engine.

A further object of the invention is the provision of a device directly associated with the drive shaft of an automobile which will normally prevent retrograde rotation of the shaft when an automobile which is propelled through instrumentalities connected with the drive shaft is located on an inclined road bed whereby the vehicle will tend to roll backwards, means being employed and adapted to be actuated by the shifting lever when moved to the reverse position for automatically releasing the locking means to permit retrograde movement under power of the drive shaft, and in which a pedal is connected with the means for manually releasing the locking means at will.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:—

Figure 1 is a fragmentary side view in elevation showing my invention applied to the transmission casing of an automobile, Figure 2 is a fragmentary plan view of the same, Figure 3 is a transverse vertical section taken along the line 3—3 of Fig. 1, Figure 4 is a vertical section taken along the line 4—4 of Fig. 3, and Figure 5 is a view in perspective of a locking dog associated with the device.

Referring more particularly to the drawings 10 designates a transmission casing of an automobile engine 11 which is adapted to be incorporated in an automobile driving the rear wheels of a vehicle, not shown, through a shaft 12. A shifting lever 13 mounted in the usual universal socket 14 carried by the transmission casing cover 15 is adapted to be rocked through a plurality of positions which in effect simulates that of the letter H.

A block 16 is secured by means of screws 17 to the rear end of the transmission casing 10 and has a central cylinder chamber 18 in which is mounted for rotation a disk 19. This disk is cut away at the periphery, as shown at 20, to provide teeth 21 which revolve in close association with the circular wall of the chamber 18. This disk is keyed to the shaft 12 and is rotated thereby. A universal joint 22 connects the transmission shaft 12 with the drive shaft 23 of the automobile.

A dog 24 is slidably mounted in a radial passage 25 and has a toe 26 adapted to engage the teeth 21 and prevent rotation of the shaft 12 in the direction indicated by the arrow, but will permit rotation of the shaft in the opposite direction by reason of the fact that the inclined portion or inner end 27 of the dog will ride over the cut away portions 20 of the disk 19.

The dog is normally maintained in an inward position by means of a pair of springs 27 which surround the bolts 28 so that one end of the spring is in engagement with the head 29 while the other end rests upon a lug 30 projecting laterally from a side edge of the dog 24. These lugs are provided with passages, as indicated in dotted lines at 31, to receive the bolts 28 whereby the dog is guided in its radial movement in the slot 25. It will be noted that a recess 32 is cut out of the block 16 in which the lugs 30 and the bolts 28 are housed. The bolts are screwed into threaded perforations in the block 16, Lugs 35 project laterally from the dog and are adapted to normally rest upon the upper end of the block 16. The plate 36 is secured to or formed integrally with the dog 24 at the upper end thereof and has an extension 37 for the purpose which will be presently explained.

A shaft 40 is mounted for rotation in a bearing 41 carried by the block 16 and has a crank 42 adapted to engage beneath the extension 37 so that when the shaft 40 is rocked the crank being normally in engagement with the underface of the extension, will elevate the extension and the dog 26 out of engagement with one of the teeth 21 of the rotatable disk 19. An arm 43 formed integrally with the shaft 40 depends therefrom and is adapted to provide means for rocking the shaft through a link 44. This link has a straight portion 45 extending upwardly from the free end of the arm, an inwardly bent portion 46 and a forwardly directed portion 47.

A lug 48 is received within a perforated ear 49 carried by the outer end of a lever 50 which is pivoted at 51 on a bracket 52 secured to the transmission casing 10. A pedal 53 is rigid with the lever 50 and so positioned that it will be engaged by the foot of the operator of the vehicle for rocking the lever 50. The lever 50, as shown in Fig. 2, has a forwardly extending portion 54, and a lateral member 55 which is formed integrally with the lever 50 adjacent the pivotal mounting 51 of said lever. An inturned lug 56 is adapted to be positioned so that the shifting lever 13 will engage the lug when the shifting lever is moved to the reverse position, whereby the lever 50 will be rocked as will be the arm 43. It will be noted that the standard gear shift is shown and the device is so applied, however, in those types of gear shifts where the reverse position is directly opposite to that of the standard gear shift that it will be necessary to modify the lever 50 and the link 44 in order to provide for such conditions.

The operation of my device is as follows:

It will be noted that the lug 56 is located at one side of the lower end of the shifting lever 13 so that it will only be in position to be engaged by the lever when the same is moved towards the reverse so that the lever is free to move in the other three positions of speed without engaging said lug and the lug 56 is positioned so that it will be readily engaged by the shifting lever when said lever is moved out of the transmission slot and into the position toward the reverse. The slight modification of the levers must be made when a shift is employed on the car which is other than the standard.

When the lever 13 is moved to the reverse position it engages the lug 56 moving the same forwardly and downwardly, thereby rocking the lever 50 and causing the link 44 to be moved rearwardly thereby rocking the arm 43 and the shaft 40. At this time the member 42 moves upwardly forcing the extension 37 upwardly and likewise the dog 24, when the toe 26 of said dog is elevated out of engagement with a tooth 21 of the disk 19. In this position the shaft 12 and the shaft 23 may be rotated in a reverse direction so that the vehicle to which these elements are attached may be moved rearwardly under the power of the engine. At all other times, however, the dog 24 and the toothed disk 19 will prevent reverse rotation of the shaft 23 and likewise retrograde movement of the vehicle.

If at any time it is desired to release the dog 24 from the disk 19 the pedal 53 may be manually actuated in the direction indicated by the arrows in Fig. 1, whereby the lever 50 will be moved upwardly pulling the link 44 in a direction which is opposite to that indicated by the arrows. This forces the member 42 upwardly through an arc, raising the dog 24 against the tension of the springs 27 and clearing the teeth of the disk 19 so that it is possible to permit the automobile to roll backwards when the shifting lever 13 has been moved to a neutral position. At this time the vehicle is not propelled rearwardly by engine power.

A coil spring 60 is secured to the transmission casing 10 at one end, while the other end is secured to the link 44 and will return lever 50 and likewise the lugs 56 to a normal inoperative position when the pedal 53 is released or when the shifting lever 13 has been moved from the reverse position to neutral.

I claim:—

1. In a vehicle, a driven shaft, means for preventing rotation of the shaft in one direction, a transmission, a shifting lever for the transmission, a pivotally mounted foot pedal connected with the means for preventing rotation of the shaft in one direction and adapted when actuated for moving the said means out of operative relation with the shaft, an arm extending from the foot pedal, a hook projecting laterally from the arm and normally disposed in the path of the shifting lever so that when the shifting lever is moved to reverse position it will actuate the means for preventing rotation of the shaft and move the same out of engagement with the shaft.

2. In a vehicle, a driven shaft, means for preventing rotation of the shaft in one direction and comprising a toothed disk secured to the shaft, a dog mounted for vertical reciprocation and provided with laterally projecting lugs, springs coacting with the lugs for maintaining the dog in engagement with the toothed disk, one end of the dog being provided with a projection, a crank having its free end located beneath the projection so that when the crank is operated the dog will be withdrawn against the action of the springs from the toothed disk, and means connected with the crank for causing manual actuation of the crank.

3. In a vehicle, a driven shaft, a shifting lever, a toothed disk secured to said shaft, a dog adapted to engage the teeth of the disk to prevent rotation of the shaft in one direction, means for releasing the dog from the teeth of the disk and including a pivotally mounted foot pedal, an arm projecting from the pedal, a crank included in the releasing means for the dog, a link connecting the crank with the free end of the arm and having a lateral projection disposed in the path of the shifting lever so that when the lever is moved to reverse position it will move the arm and link and thereby release the dog from the teeth of the disk, said foot pedal being adapted to be actuated for causing independent actuation of the crank and release of the dog from the toothed disk.

ALFRED B. SMALL.